(12) United States Patent
Fujita (10) Patent No.: US 11,187,167 B2
(45) Date of Patent: Nov. 30, 2021

(54) EVAPORATED FUEL TREATMENT APPARATUS

(71) Applicant: AISAN KOGYO KABUSHIKI KAISHA, Obu (JP)

(72) Inventor: Yuki Fujita, Gifu (JP)

(73) Assignee: AISAN KOGYO KABUSHIKI KAISHA, Obu (JP)

( * ) Notice: Subject to any disclaimer, the term of this patent is extended or adjusted under 35 U.S.C. 154(b) by 0 days.

(21) Appl. No.: 17/064,758

(22) Filed: Oct. 7, 2020

(65) Prior Publication Data

US 2021/0115862 A1   Apr. 22, 2021

(30) Foreign Application Priority Data

Oct. 16, 2019   (JP) .............................. JP2019-189659

(51) Int. Cl.
*F02D 41/00*   (2006.01)
*B01D 53/04*   (2006.01)
*F02M 25/08*   (2006.01)
*F02M 35/10*   (2006.01)

(52) U.S. Cl.
CPC ....... *F02D 41/004* (2013.01); *B01D 53/0415* (2013.01); *B01D 53/0446* (2013.01); *B01D 53/0454* (2013.01); *F02D 41/0045* (2013.01); *F02M 25/0836* (2013.01); *F02M 35/10222* (2013.01); *B01D 2259/40003* (2013.01); *B01D 2259/40086* (2013.01); *B01D 2259/4516* (2013.01)

(58) Field of Classification Search
CPC .... F02D 41/00; F02D 41/004; F02D 41/0045; B01D 53/04; B01D 53/0415; B01D 53/530446; B01D 53/0454; B01D 2259/40003; B01D 2259/40086; B01D 2259/4516; F02M 25/0836; F02M 35/0022
See application file for complete search history.

(56) References Cited

U.S. PATENT DOCUMENTS 5,411,007 A  *  5/1995  Narita ................. F02D 41/0042
                                                  123/519
11,105,283 B2 *  8/2021  Nakagawa ............ F02D 41/004
2020/0232422 A1   7/2020  Asanuma

FOREIGN PATENT DOCUMENTS

JP       2017-044918 A    3/2017
JP       2018-145959 A    9/2018

* cited by examiner

*Primary Examiner* — Hieu T Vo
(74) *Attorney, Agent, or Firm* — Oliff PLC

(57) ABSTRACT

An evaporated fuel treatment apparatus includes a canister, a purge passage, a purge pump, a purge valve, and a controller for executing purge control. The controller is configured to switch the purge valve to a closed state or an open state once, subsequently set a concentration sensing flag to ON, and then detect a purge concentration based on a pump downstream pressure or a pump differential pressure at a predetermined timing elapsed by a predetermined time from setting of the concentration sensing flag to ON.

8 Claims, 9 Drawing Sheets

FIG. 9

EVAPORATED FUEL TREATMENT APPARATUS

CROSS-REFERENCE TO RELATED APPLICATIONS

This application is based upon and claims the benefit of priority from the prior Japanese Patent Applications No. 2019-189659 filed on Oct. 16, 2019, the entire contents of which are incorporated herein by reference.

BACKGROUND

Technical Field

The present disclosure relates to an evaporated fuel treatment apparatus for treatment to introduce evaporated fuel generated in a fuel tank into an engine.

Related Art

Japanese unexamined patent application publication No. 2018-145959 (JP 2018-145959A) discloses an evaporated fuel treatment apparatus configured to close or open a purge control valve provided in a purge passage once, and then open or close the purge control valve and detect a purge concentration at this time based on the pressure in the purge passage detected by a pressure sensor (i.e., a concentration detecting unit).

SUMMARY

Technical Problems

In the evaporated fuel treatment apparatus disclosed in JP2018-145959A, there is a time lag from when the purge control valve is opened or closed (e.g., from when a valve-opening execution flag or a valve-closing execution flag is turned ON) to when the pressure in the purge passage actually starts to vary. Therefore, if the purge concentration is detected based on such an internal pressure of the purge passage at the time point when the purge control valve is opened or closed as disclosed in JP2018-145959A, the pressure in the purge passage may not be sufficiently stable and thus it may be impossible to detect the purge concentration stably.

The present disclosure has been made to address the above problems and has a purpose to provide an evaporated fuel treatment apparatus capable of detecting a more stable purge concentration.

Means of Solving the Problems

To achieve the above-mentioned purpose, one aspect of the present disclosure provides an evaporated fuel treatment apparatus comprising: a canister configured to store evaporated fuel; a purge passage configured to allow purge gas containing the evaporated fuel to flow from the canister to an engine through an intake passage; a purge pump provided in the purge passage and configured to deliver the purge gas to the intake passage; a purge valve configured to open and close the purge passage; and a controller configured to drive the purge valve under duty control while driving the purge pump to execute purge control to introduce the purge gas from the canister to the engine through the purge passage and the intake passage, wherein the controller is configured to switch the purge valve to a closed state or an open state once, subsequently set either a valve-opening execution flag to switch the purge valve to the open state or a valve-closing execution flag to switch the purge valve to the closed state, and then detect a purge concentration corresponding to a concentration of the evaporated fuel in the purge gas based on a pressure in the purge passage downstream of the purge pump or a front-rear differential pressure of the purge pump in the purge passage at a predetermined timing elapsed by a predetermined time from when the valve-opening execution flag or the valve-closing execution flag is set to ON.

According to the above-described aspect, the evaporated fuel treatment apparatus is configured to detect a purge concentration based on a downstream pressure of the purge pump or a differential pressure of the purge pump, i.e., a difference in pressure between the front and the back of the purge pump, which is more stable than when a valve-opening execution flag or a valve-closing execution flag is set to ON. Accordingly, the evaporated fuel treatment apparatus can detect the purge concentration more stably than when the purge concentration is detected at the time point when the valve-opening execution flag or the valve-closing execution flag is turned ON.

The foregoing evaporated fuel treatment apparatus of the present disclosure can therefore detect a stable purge concentration.

DETAILED DESCRIPTION OF THE EXEMPLARY EMBODIMENTS

A detailed description of an embodiment of an evaporated fuel treatment apparatus which is one of typical embodiments of this disclosure will now be given referring to the accompanying drawings.

<Outline of Internal Combustion Engine System>

The outline of an internal combustion engine system 100 including an evaporated fuel treatment apparatus 1 in a present embodiment will be described first and then the evaporated fuel treatment apparatus 1 will be explained. The internal combustion engine system 100 is to be used in a vehicle, such as a car.

Figure 1:
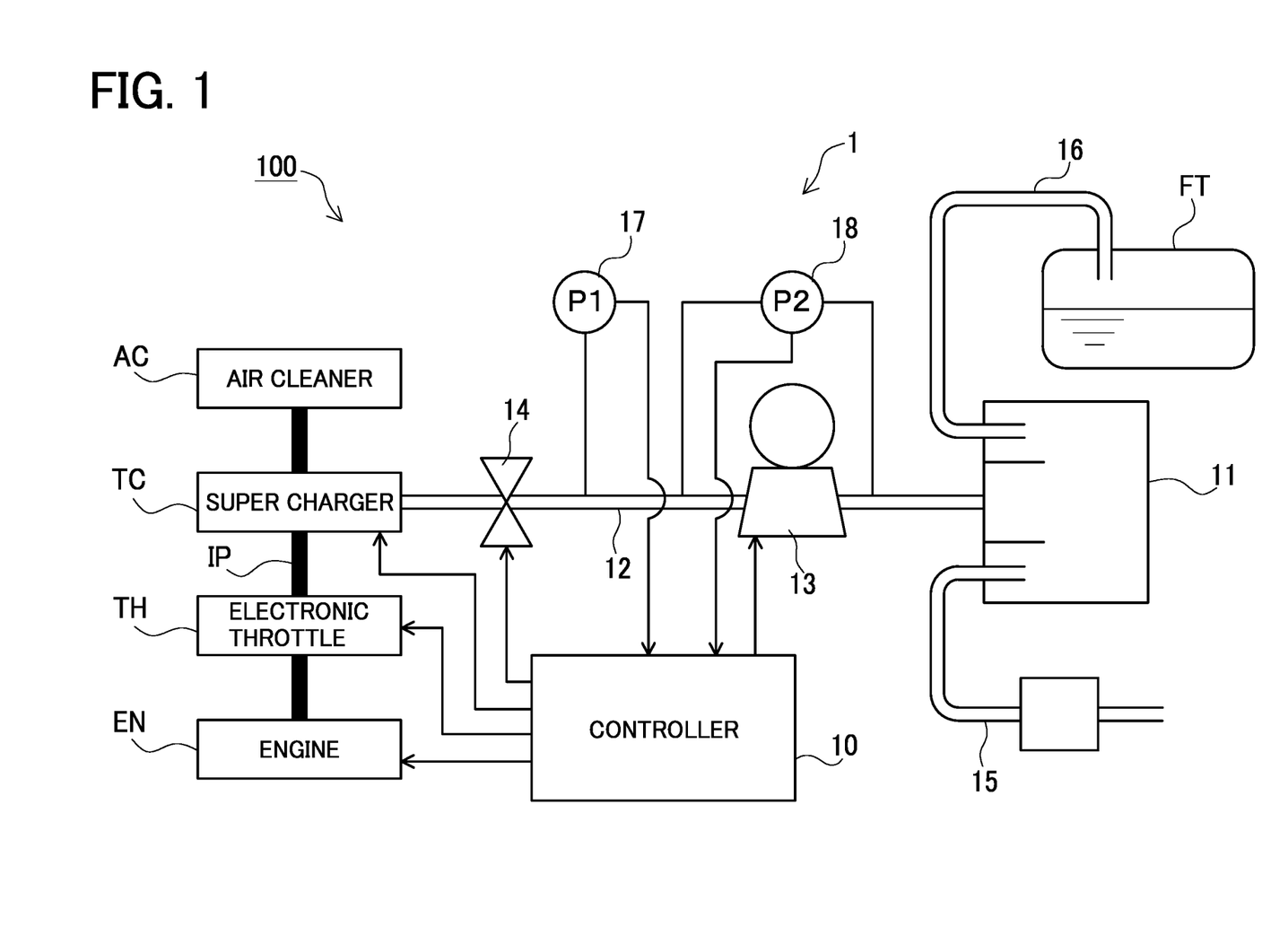
FIG. 1 is a configuration view of a whole internal combustion engine system including an evaporated fuel treatment apparatus in an embodiment.

In the internal combustion engine system 100, as shown in FIG. 1, an engine EN, i.e. an internal combustion engine, is connected to an intake passage IP for supply of air (intake air) into the engine EN. In this intake passage IP, an electronic throttle TH, i.e. a throttle valve, is provided to open and close the intake passage IP to thereby control an amount of air (an intake air amount) allowed to flow in the engine EN.

In the intake passage IP upstream of the electronic throttle TH, that is, on an upstream side in a flowing direction of the intake air, an air cleaner AC is provided to remove foreign substances from the air flowing in the intake passage IP. In the intake passage IP, therefore, the air after passing through the air cleaner AC is introduced into the engine EN.

Further, a supercharger TC is placed in the intake passage IP at a position between the air cleaner AC and the electronic throttle TH.

The internal combustion engine system 100 includes the evaporated fuel treatment apparatus 1. This evaporated fuel treatment apparatus 1 is an apparatus for treatment to introduce purge gas into the engine EN through the intake passage IP, the purge gas containing evaporated fuel generated in a fuel tank FT that stores therein a fuel to be supplied to the engine EN.

The internal combustion engine system 100 further includes a controller 10. This controller 10 is a part of an ECU (not shown) mounted in a vehicle. As an alternative, the controller 10 may be provided separately from the ECU. The controller 10 includes memories, such as a CPU, a ROM, and a RAM. The controller 10 is configured to control the internal combustion engine system 100 according to programs stored in advance in the memories. Furthermore, the controller 10 is configured to retrieve detection results from various sensors, such as a gauge pressure sensor 17 and a differential pressure sensor 18 which will be described later. The controller 10 also serves as a controller of the evaporated fuel treatment apparatus 1 to control the evaporated fuel treatment apparatus 1.

<Outline of Evaporated Fuel Treatment Apparatus>

The outline of the evaporated fuel treatment apparatus 1 will be described below.

The evaporated fuel treatment apparatus 1 in the present embodiment is configured to introduce evaporated fuel from the fuel tank FT to the engine EN through the intake passage IP. This evaporated fuel treatment apparatus 1 includes, as shown in FIG. 1, the controller 10, a canister 11, a purge passage 12, a purge pump 13, a purge valve 14, an atmosphere passage 15, a vapor passage 16, the gauge pressure sensor 17, the differential pressure sensor 18, and others.

The canister 11 is connected to the fuel tank FT through the vapor passage 16 and configured to temporarily store the evaporated fuel flowing therein from the fuel tank FT through the vapor passage 16. The canister 11 communicates with the purge passage 12 and the atmosphere passage 15.

The purge passage 12 is connected to the intake passage IP and the canister 11. Accordingly, the purge gas flowing out of the canister 11, that is, gas that contains the evaporated fuel, flows through the purge passage 12 and then enters in the intake passage IP. In other words, the purge passage 12 serves allow the purge gas to flow from the canister 11 to the engine EN through the intake passage IP. In an example shown in FIG. 1, the purge passage 12 is connected to the intake passage IP via the supercharger TC.

The purge pump 13 is placed in the purge passage 12 and configured to deliver purge gas from the canister 11 into the purge passage 12 and then to the intake passage IP.

The purge valve 14 is placed in the purge passage 12 at a position downstream of the purge pump 13 in a flowing direction of purge gas, that is, on a side close to the intake passage IP. The purge valve 14 is operative to open and close the purge passage 12. While the purge valve 14 is in a closed state, the purge gas in the purge passage 12 is blocked by the purge valve 14 from flowing to the intake passage IP. While the purge valve 14 is in an open state, on the other hand, the purge gas is allowed to flow to the intake passage IP.

The purge valve 14 is driven under a duty control to continuously switch between the open state and the closed state according to a duty ratio set depending on an operating condition of the engine EN. When the purge valve 14 is in the open state, the purge passage 12 is opened, thus establishing communication between the canister 11 and the intake passage IP. When the purge valve 14 is in the closed state, the purge passage 12 is closed, thus blocking communication between the canister 11 and the intake passage IP through the purge passage 12. The open state and the closed state of the purge valve 14 are continuously switched at intervals in which a pair of one open state and one closed state which are continuous is assumed as one cycle. The duty ratio represents a ratio of a period of the open state to the closed state in the one cycle. The purge valve 14 is operated at the duty ratio, i.e., with a time length of the open state, adjusted to regulate a flow rate of the purge gas.

The atmosphere passage 15 has one end that is open in the atmosphere and the other end connected to the canister 11 to allow the canister 11 to communicate with the atmosphere. In the atmosphere passage 15, the air taken from the atmosphere flows. In other words, the atmosphere passage 15 serves to take atmospheric air into the canister 11.

The vapor passage 16 is connected to the fuel tank FT and the canister 11. Thus, the evaporated fuel generated in the fuel tank FT is allowed to flow in the canister 11 through the vapor passage 16.

The gauge pressure sensor 17 is placed in the purge passage 12 at a position downstream of the purge pump 13, concretely, at a position between the purge pump 13 and the purge valve 14. The gauge pressure sensor 17 is configured to detect the pressure in the purge passage 12 downstream of the purge pump 13, that is, the downstream pressure of the purge pump 13 (i.e., the ejection pressure of the purge pump 13).

The differential pressure sensor 18 is configured to detect a differential pressure between two points in the purge passage 12, i.e., the front and the rear of the purge pump 13, which will be referred to as a front-rear differential pressure of the purge pump 13.

In the evaporated fuel treatment apparatus 1 configured as above, when purge conditions are satisfied during operation of the engine EN, the controller 10 drives the purge valve 14 under the duty control while driving the purge pump 13 to thereby perform purge control to introduce purge gas from the canister 11 to the engine EN through the purge passage 12 and the intake passage IP.

While the purge control is under execution, the engine EN is supplied with the air taken in the intake passage IP, the fuel injected from the fuel tank FT through an injector (not shown), and the purge gas introduced into the intake passage IP under the purge control. The controller 10 is configured to adjust the injection time of the injector, the valve-opening time of the purge valve 14, the rotation speed of the purge pump 13, and other conditions to adjust an air/fuel ratio (A/F) of the engine EN to an optimal value, e.g., an ideal air/fuel ratio.

<Configuration to Detect Purge Concentration>

In the present embodiment, the controller 10 is configured to detect a purge concentration based on the pressure in the purge passage 12. To be specific, the controller 10 detects a purge concentration based on either the pressure detected by the gauge pressure sensor 17 (hereinafter, referred to as a pump downstream pressure) or the pressure detected by the differential pressure sensor 18 (hereinafter, referred to as a pump differential pressure). The purge concentration means a concentration of evaporated fuel in purge gas. Further, the controller 10 detects a purge concentration based on the pump downstream pressure or the pump differential pressure by use of for example a map not shown prescribing a relationship between either the pump downstream pressure or the pump differential pressure and the purge concentration.

Figure 2:
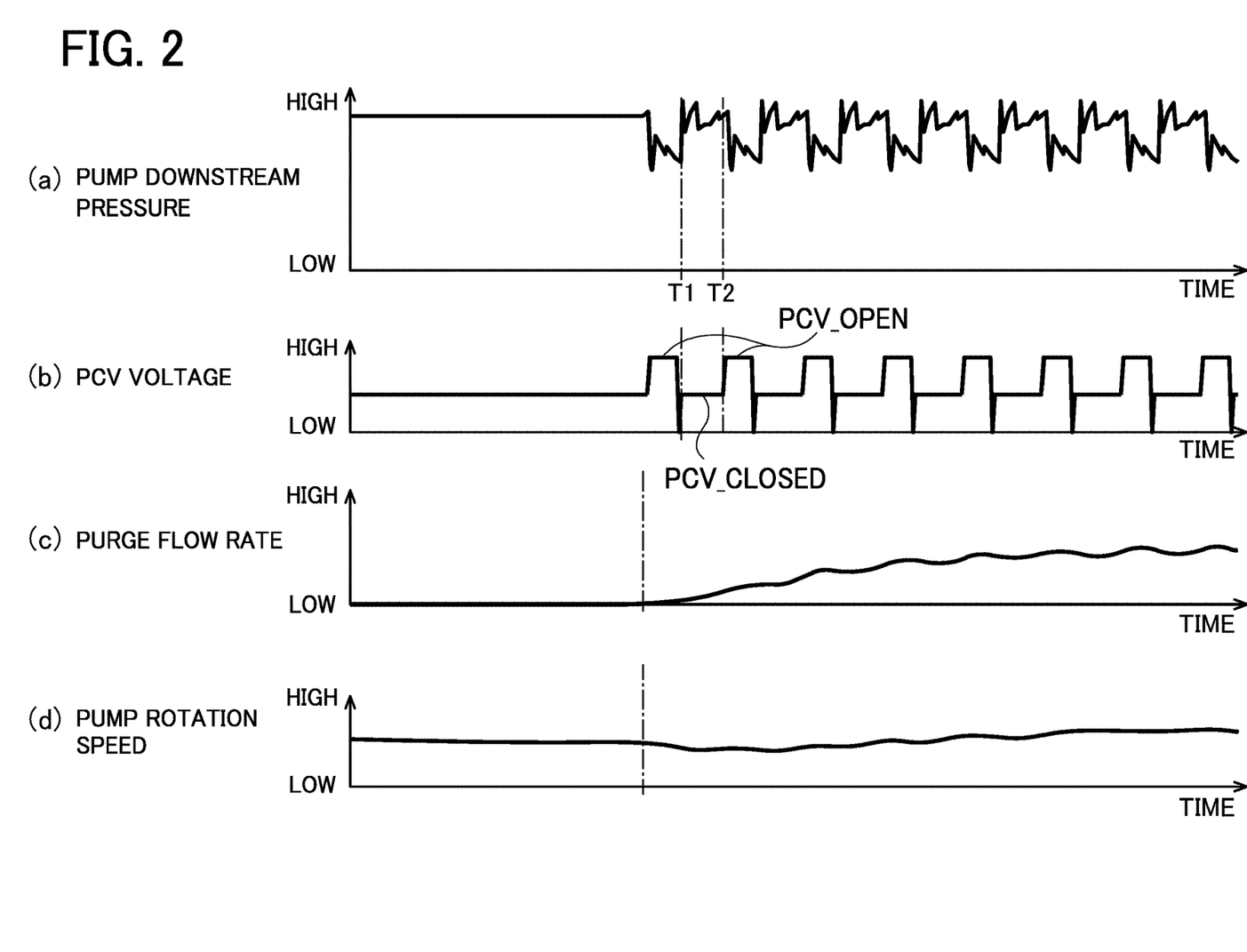
FIG. 2 shows charts providing one example of time variations of pump downstream pressure, PCV voltage, purge flow rate, and pump rotation speed.
Figure 3:
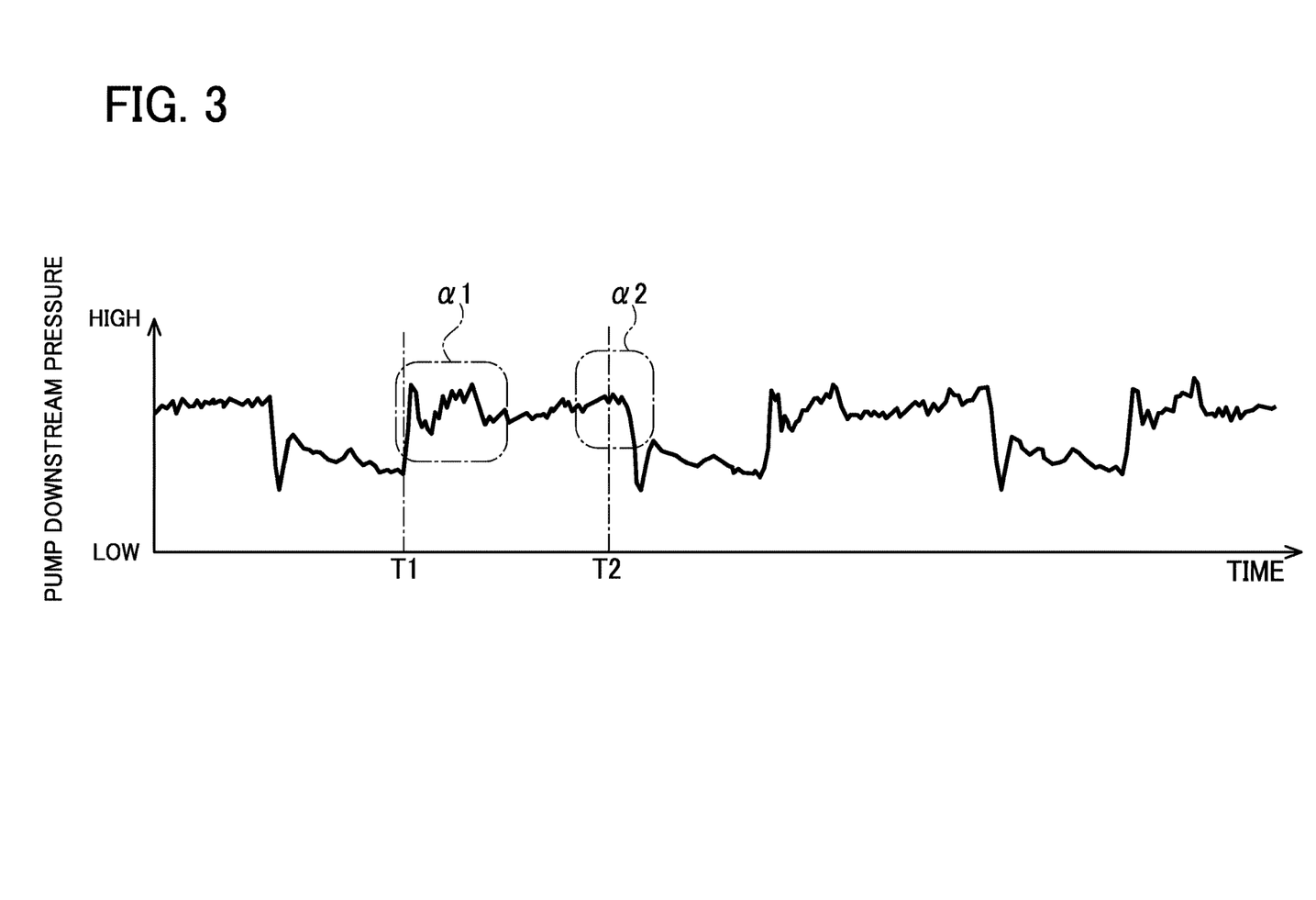
FIG. 3 is an enlarged chart of the time variations in pump downstream pressure in FIG. 2.

Detecting the purge concentration based on the pump downstream pressure or the pump differential pressure as above is performed for example based on the pump downstream pressure or the pump differential pressure obtained while the purge valve 14 is in the closed state. At that time, when the purge concentration is detected based on the pump downstream pressure for example, as shown in FIGS. 2 and 3, the pump downstream pressure is unstable at the moment when the purge valve 14 is changed from the open state (indicated with "PCV_Open" in FIG. 2) to the closed state (indicated with "PCV_Closed" in FIG. 2), that is, on or about time T1 as indicated as a time region α1 in FIG. 3. At the moment when the purge valve 14 is switched from the open state to the closed state, therefore, detecting the purge concentration is performed based on such unstable pump downstream pressures, so that a stable purge concentration could not be obtained.

In FIG. 2, the vertical-axis label in each chart represents the following contents: PCV VOLTAGE is a voltage to be applied to a driving unit (not shown) for opening and closing the purge valve 14, PURGE FLOW RATE is a flow rate of the purge gas flowing through the purge passage 12, and PUMP ROTATION SPEED is a rotation speed of the purge pump 13.

In contrast, as shown in FIGS. 2 and 3, when the purge valve 14 is switched from the open state to the closed state and subsequently, after a while, the purge valve 14 is changed from the closed state to the open state (on or about time T2 in FIGS. 2 and 3 as indicated as a time region α2 in FIG. 3), the pump downstream pressure is stable. Therefore, it is conceivable to read such a stable pump downstream pressure obtained when the purge valve 14 is switched from the closed state to the open state and, based on this read pump downstream pressure, detect a stable purge concentration.

Figure 4:
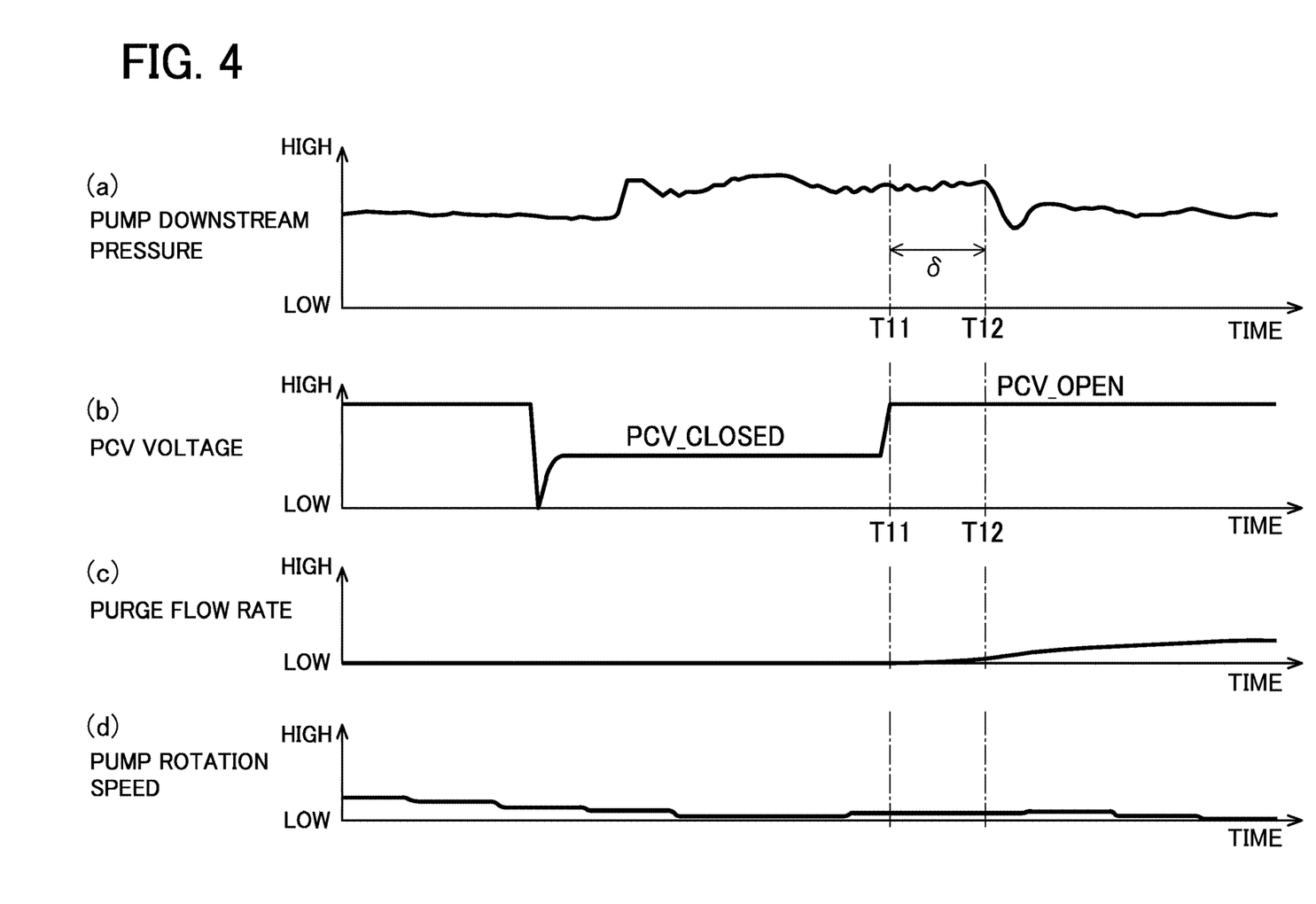
FIG. 4 is an explanatory view showing that there is a time lag from when a purge valve is turned to an open state from a closed state (that is, at the time when the valve-opening execution flag is turned ON) to when the pump downstream pressure starts to vary.

Herein, as shown in FIG. 4, there is a very small time lag 6, as a response delay, between time T11 at which the purge valve 14 is switched from the closed state to the open state, that is, the time point when the valve-opening execution flag is turned ON, and time T12 at which the pump downstream pressure starts to decrease accordingly. At that time, the pump downstream pressure is stable just before the pump downstream pressure starts to decrease after the purge valve 14 is switched from the closed state to the open state as compared with those in other periods. Accordingly, for the purpose of detecting a more stable purge concentration, it is preferable to read the more stable pump downstream pressure just before the pump downstream pressure starts to decrease after switching of the purge valve 14 from the closed state to the open state than pump downstream pressures detected in other periods, and detect a purge concentration based on this read pump downstream pressure. In the present embodiment, therefore, the controller 10 is configured, in consideration of the foregoing response delay, to read a more stable pump downstream pressure or a more stable pump differential pressure, and detect a purge concentration based on this read pump downstream pressure or pump differential pressure.

Therefore, concrete examples of a configuration of the foregoing evaporated fuel treatment apparatus to detect a purge concentration in the present embodiment will be described below.

Example 1

Figure 5:
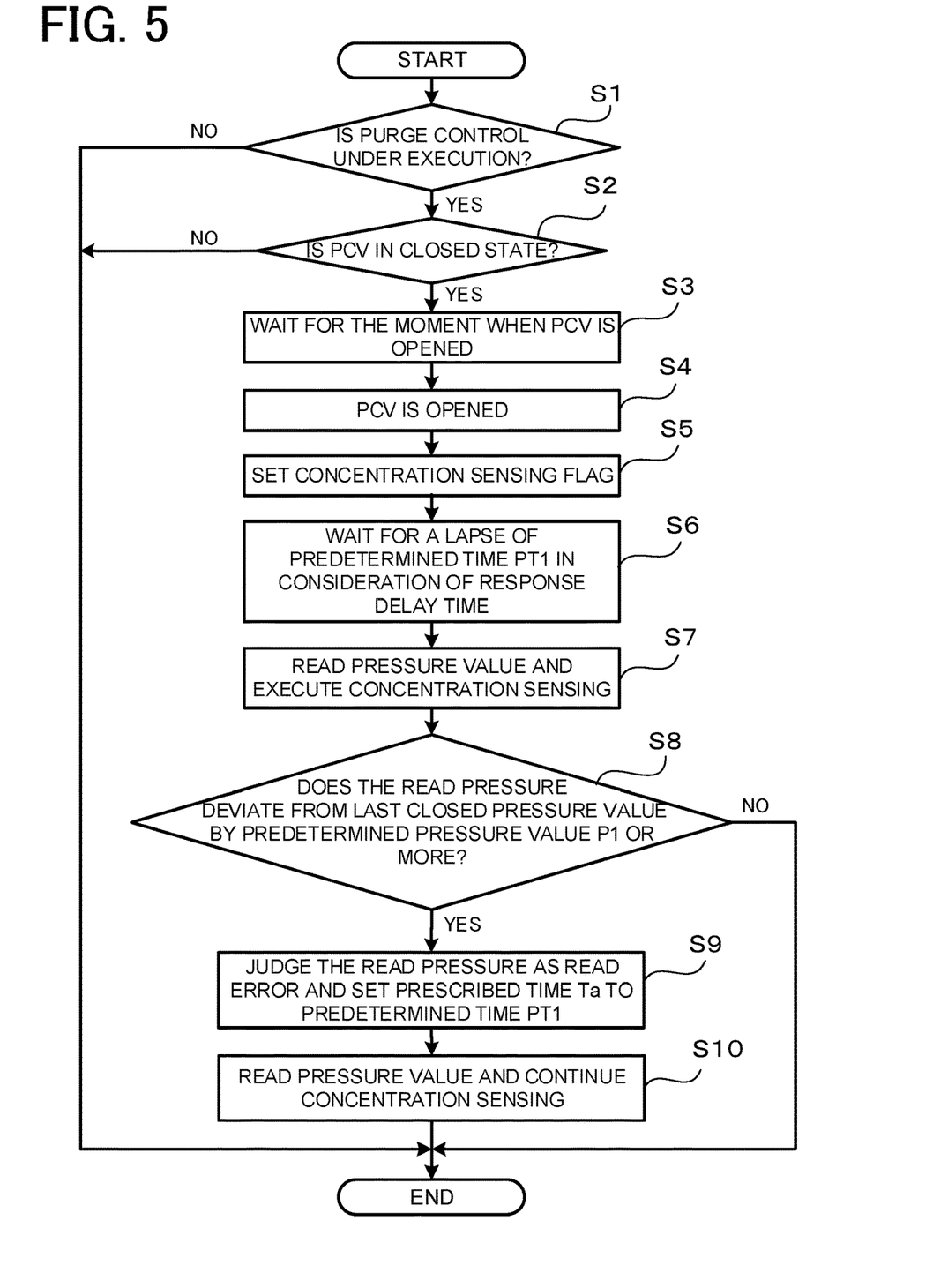
FIG. 5 is a flowchart showing a configuration to detect a purge concentration in Example 1.

The configuration of the evaporated fuel treatment apparatus to detect a purge concentration in Example 1 will be first described below. In this example, specifically, the controller 10 is configured to detect a purge concentration based on a flowchart shown in FIG. 5. As shown in FIG. 5, when the purge control is under execution (step S1: YES) and the PCV, i.e., the purge valve 14, is in a closed state (step S2: YES), the controller 10 waits for the moment when the PCV is opened (step S3). Specifically, during execution of the purge control, when the purge valve 14 is in the closed state, the controller 10 waits until the purge valve 14 is switched to the open state. In this way, during execution of the purge control, the controller 10 switches the purge valve 14 to the closed state once and then waits until to switch the purge valve 14 to an open state.

When the PCV is opened (step S4), the controller 10 subsequently sets a concentration sensing flag (step S5). Specifically, when switching the purge valve 14 from the closed state to the open state, the controller 10 sets the concentration sensing flag to ON. Herein, the concentration sensing flag is one example of a "valve-opening execution flag" to switch the purge valve to the open state. The operation: "setting the concentration sensing flag to ON" concretely means that a value of the concentration sensing flag is changed from 0 to 1.

Then, the controller 10 waits for a lapse of a predetermined time PT1 in consideration of a response delay time (step S6) and then reads a pressure value to execute the concentration sensing (step S7). Concretely, after setting the concentration sensing flag to ON (step S5) and a lapse of the predetermined time PT1, the controller 10 reads either a pump downstream pressure or a pump differential pressure and detects a purge concentration based on the read pump downstream pressure or pump differential pressure retrieved at a predetermined timing (step S7). In this way, at a predetermined timing after the predetermined time PT1 elapses from when the concentration sensing flag is set to ON, more concretely, at a predetermined timing after a lapse of the predetermined time PT1 from setting of the concentration sensing flag to ON and further before the pump downstream pressure or pump differential pressure starts to decrease, the controller 10 detects a purge concentration based on a pump downstream pressure or pump differential pressure.

Herein, the predetermined time PT1 is determined by calculation based on information related to the state of the purge passage 12, e.g., a structural state of the purge passage, a condition(s) of a gas flowing through the purge passage. Specifically, the predetermined time PT1 (unit: seconds (s)), that is, a response delay time of the pump downstream pressure or pump differential pressure, is calculated by the following expressions.

$$PT1 = L/a \quad (1)$$

$$a = \sqrt{\frac{k}{\rho}} \quad (2)$$

$$\rho = (T0/T) \times (P/P0) \times \rho 0 \quad (3)$$

In the above expressions, the information related to the state of the purge passage 12 is expressed as follows: L denotes a pipe length of the purge passage 12 (unit: m), K denotes a volume elasticity modulus (unit: Pa), a denotes a sonic speed (unit: m/s) in a fluid (i.e., a purge gas), ρ denotes a density, i.e., the density of purge gas (unit: kg/m$^3$), ρ0 is a density (unit: kg/m$^3$) in a normal state (i.e., 0° C. and 1 atmospheric pressure), T0 denotes a thermodynamic temperature (unit: K) in the normal state, T is a thermodynamic temperature (unit: K), P0 denotes the pressure of gas (unit: kPa) in the normal state, and P is the pressure of gas (unit: kPa).

In the information related to the state of the purge passage 12, for example, the sonic sound a in the fluid is calculated by use of the density ρ as shown in the foregoing expressions. This density ρ changes according to the purge concentration; however, in Example 1, the density ρ is assumed as a value calculated by use of a previous detection value of purge concentration, that is, a last purge concentration value detected in a purge concentration detection performed the previous time. In Example 1, specifically, the information (e.g., the sonic speed a in the fluid) calculated based on the previous detection value of purge concentration is used as the information related to the state of the purge passage 12.

Returning to FIG. 5, the controller 10 subsequently compares the pump downstream pressure or pump differential pressure read in step S7 with a last closed pressure (i.e., the pump downstream pressure or pump differential pressure read just before step S5). When the read pump downstream pressure or pump differential pressure deviates by a predetermined pressure value P1 (e.g., 1 kPa) or more from the last closed pressure (step S8: YES), the controller 10 judges the read pressure as a read error and sets a prescribed time Ta to the predetermined time PT1 (step S9).

Specifically, the controller 10 compares the pump downstream pressure or the pump differential pressure obtained in step S7 (i.e., at the predetermined timing) with the corresponding pump downstream pressure or pump differential pressure obtained just before the concentration sensing flag is set, i.e., just before step S5. When those compared two values, i.e., two pump downstream pressure values or two pump differential pressure values, are different from each other by the predetermined pressure value P1 or more, the controller 10 judges it is a pressure read error and forcibly changes the predetermined time PT1 to the prescribed time Ta. This prescribed time Ta is a previously set time, e.g., 0.01 (s) in the present example.

In the above manner, when judging that the pump downstream pressure or pump differential pressure at the predetermined timing, i.e., in step S7 deviates by the predetermined pressure value P1 or more from the pump downstream pressure or pump differential pressure detected just before the concentration sensing flag is set to ON, i.e., just before step S5, the controller 10 changes the predetermined time PT1 to the prescribed time Ta.

After setting the prescribed time Ta as the predetermined time PT1 as above (step S9), the controller 10 reads a pressure value and continues the concentration sensing (step S10).

Specifically, the controller 10 forcibly changes the predetermined time PT1 to the prescribed time Ta and then reads the pump downstream pressure or pump differential pressure and detects a purge concentration based on the read pump downstream pressure or pump differential pressure.

After changing the predetermined time PT1 to the prescribed time Ta as above, the controller 10 then performs next purge concentration detection. At that time, the controller 10 detects the purge concentration based on either the pump downstream pressure or the pump differential pressure at a predetermined timing elapsed by the prescribed time Ta from when the concentration sensing flag is set to ON.

According to Example 1 as described above, the controller 10 switches the purge valve 14 to the closed state once and then sets the concentration sensing flag (i.e., the valve-opening execution flag) to ON, thereby switching the purge valve 14 to the open state, and, after a lapse of the predetermined time PT1 therefrom, detects a purge concentration based on the pump downstream pressure or pump differential pressure at the predetermined timing.

The controller 10 is configured as above to detect a purge concentration based on the pump downstream pressure or pump differential pressure more stabilized than at the time when the concentration sensing flag is turned ON. Thus, the controller 10 can detect a purge concentration stably than when detecting a purge concentration at the time of setting the concentration sensing flag to ON.

The predetermined time PT1 is calculated based on the information related to the purge passage 12.

This makes it possible to optimize the timing for detecting a purge concentration according to the state of the purge passage 12. Accordingly, the controller 10 can read the stable pump downstream pressure or pump differential pressure according to the state of the purge passage 12 and detect a purge concentration based on this stable pump downstream pressure or pump differential pressure. Consequently, the detection of a stable purge concentration can be performed.

As the information related to the state of the purge passage 12, the information calculated based on the detection value of the previous, or last, purge concentration.

This enables improvement of the accuracy of the information related to the state of the purge passage 12. Accordingly, the timing for detecting a purge concentration can be further optimized according to the state of the purge passage 12. Detection of a purge concentration can therefore be performed further stably.

Moreover, when the pump downstream pressure or the pump differential pressure read at the predetermined timing deviates by the predetermined pressure value P1 or more from the pump downstream pressure or the pump differential pressure read just before the concentration sensing flag is set to ON, the controller 10 detects a purge concentration by changing the predetermined time PT1 to the prescribed time Ta.

Accordingly, after switching the purge valve 14 to the open state, the controller 10 can prevent from erroneously performing detection of a purge concentration based on the pump downstream pressure or the pump differential pressure that has started to decrease. Detection of a purge concentration can therefore be performed further stably.

Example 2

Figure 6:
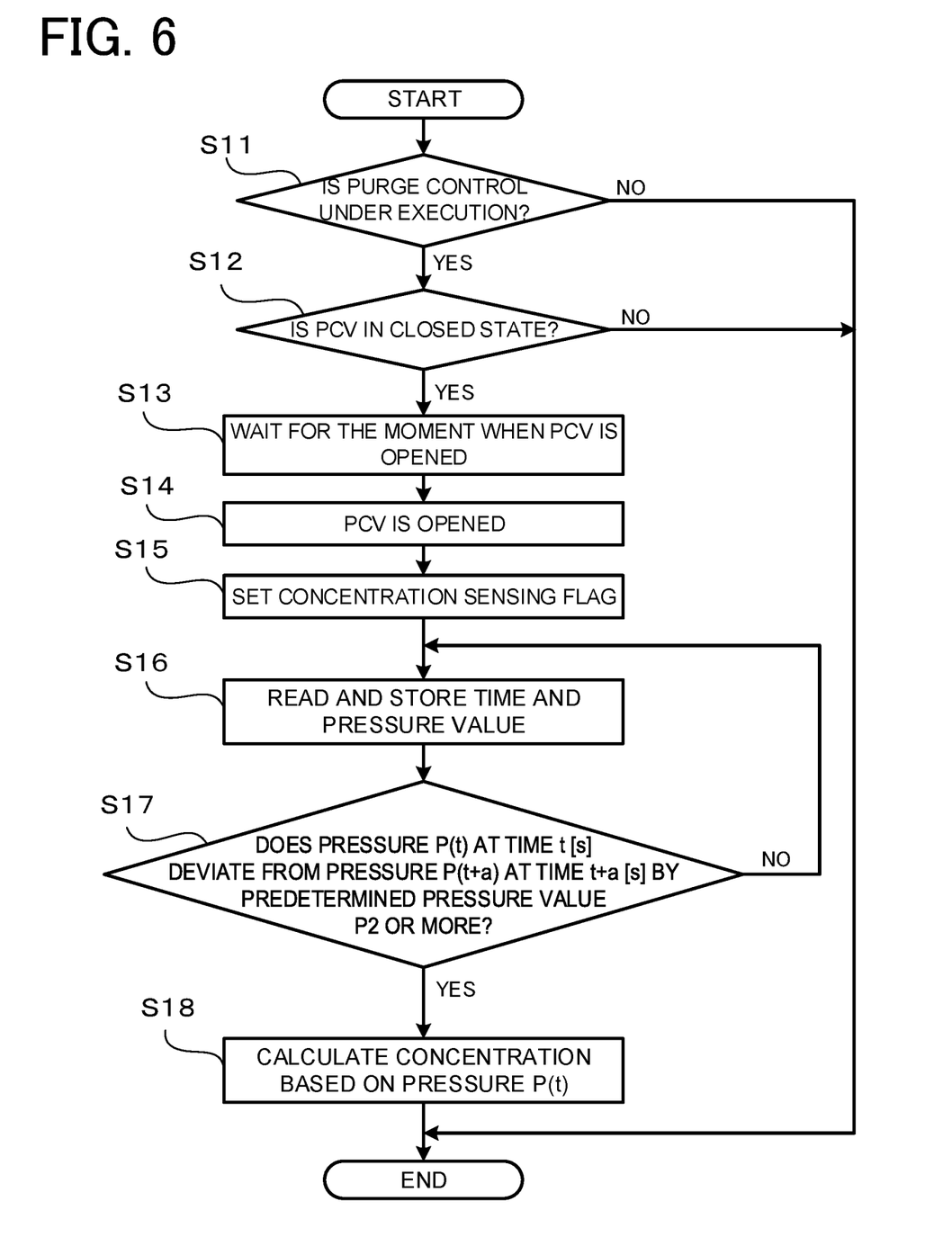
FIG. 6 is a flowchart showing a configuration to detect a purge concentration in Example 2.
Figure 7:
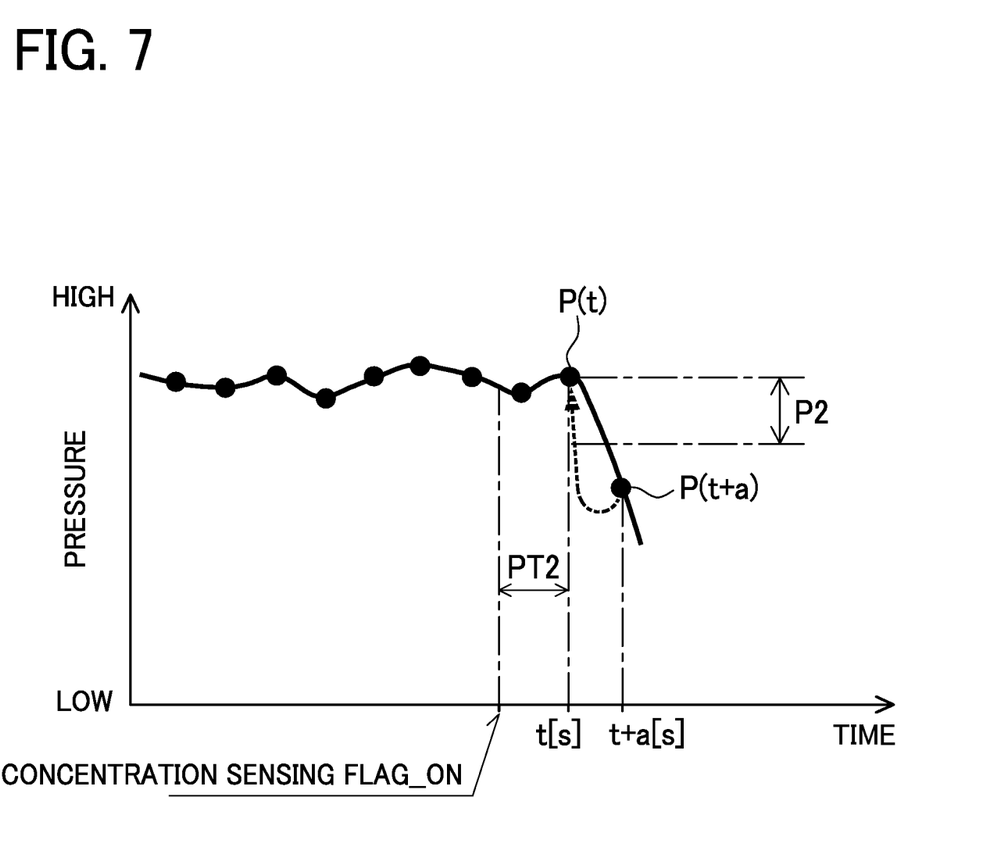
FIG. 7 is a graph showing one example of discrete data of time variations in pressure, i.e., a pump downstream pressure or a pump differential pressure.

Detecting of a purge concentration in Example 2 will be described below. This example differs from Example 1 in that the controller 10 is configured to set the concentration sensing flag (step S15) and then read and store a read time and the pressure value (step S16) as shown in FIG. 6. Specifically, the controller 10 sets the concentration sensing flag to ON and then reads and stores either the pump downstream pressure or the pump differential pressure at each time. At that time, for example, the controller 10 obtains discrete data (i.e., a set of data on plot points) as stored data on the pump downstream pressure or the pump differential pressure as shown in FIG. 7. In FIG. 6, steps S11 to S15 are the same as steps S1 to S5 in FIG. 5.

Returning to FIG. 6, assuming that the pump downstream pressure (or alternatively, the pump differential pressure) is a pressure P(t) and a pressure P(t+a), if the pressure P(t) at time t [s] deviates from the pressure P(t+a) at time t+a [s] by a predetermined pressure value P2 or more (step S17: YES), the controller 10 calculates a purge concentration based on the pressure P(t) (step S18). Specifically, when a difference between the pressure P(t) and the pressure P(t+a) is the predetermined pressure value P2 or more, the controller 10 detects a purge concentration based on the pressure P(t), not on the pressure P(t+a). In other words, furthermore, when a change rate of the pressure with time (also referred to as a "pressure temporal change rate") changing from the pressure P(t) to the pressure P(t+a) is equal to or larger than a predetermined change rate, the controller 10 detects a purge concentration based on the pressure P(t), not on the pressure P(t+a). The pressure temporal change rate indicates a change rate of pressure per a given period of time (a unit time).

In the above manner, when the data on pressure (i.e., the pump downstream pressure or the pump differential pressure) is discrete data, for example, the controller 10 detects a purge concentration based on the pressure P(t) at a time t [s] specified retroactively from the time t+a [s]. This term "a [s]" denotes a sampling cycle.

In this Example 2, as shown in FIG. 7, the predetermined timing elapsed by the predetermined time PT2 from setting of the concentration sensing flag to ON is the specified time t [s] going back from the time t+a [s] at which the pressure temporal change rate (i.e., the pump downstream pressure or the pump differential pressure) becomes a predetermined change rate or more after setting of the concentration sensing flag to ON. The controller 10 thus detects a purge concentration based on the pressure P(t) (i.e., the pump downstream pressure or the pump differential pressure) at this predetermined timing, t [s].

According to Example 2, as described above, the controller 10 switches the purge valve 14 to the closed state once, subsequently switches the purge valve 14 to the open state and also sets the concentration sensing flag to ON, and then detects a purge concentration based on the pump downstream pressure or the pump differential pressure read at the predetermined timing elapsed by the predetermined time PT2 from the time of setting the concentration sensing flag to ON.

The evaporated fuel treatment apparatus 1 in Example 2 configured as above can detect a purge concentration stably.

In Example 2, the predetermined timing is assumed as the time point specified retroactively from the time point when the temporal change rate of the pump downstream pressure or the pump differential pressure becomes a predetermined change rate or more after the concentration sensing flag is set to ON.

Accordingly, the evaporated fuel treatment apparatus 1 in Example 2 can detect a purge concentration based on a more stable pump downstream pressure or pump differential pressure obtained just before starting to decrease or increase after the purge valve 14 is switched to the open state. Thus, detection of the purge concentration can be performed more stably.

The controller 10 may be configured to detect a purge concentration by changing the predetermined time PT2 to the prescribed time Ta when the pump differential pressure or the pump differential pressure detected at the predetermined timing deviates from the corresponding pump downstream pressure or pump differential pressure, detected just before the concentration sensing flag is set to ON by the predetermined pressure value P1 or more.

Example 3

Figure 8:
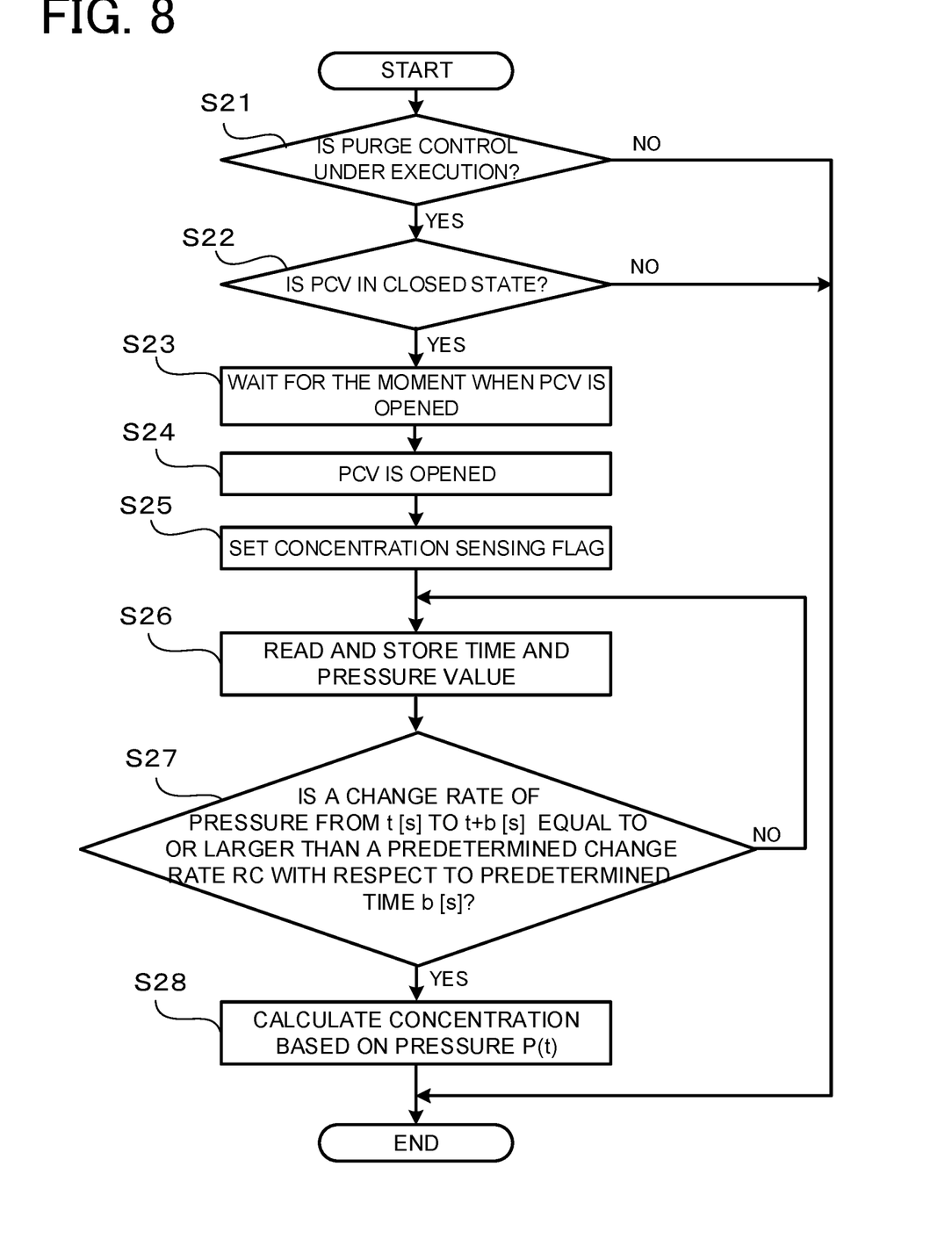
FIG. 8 is a flowchart showing a configuration to detect a purge concentration in Example 3.
Figure 9:
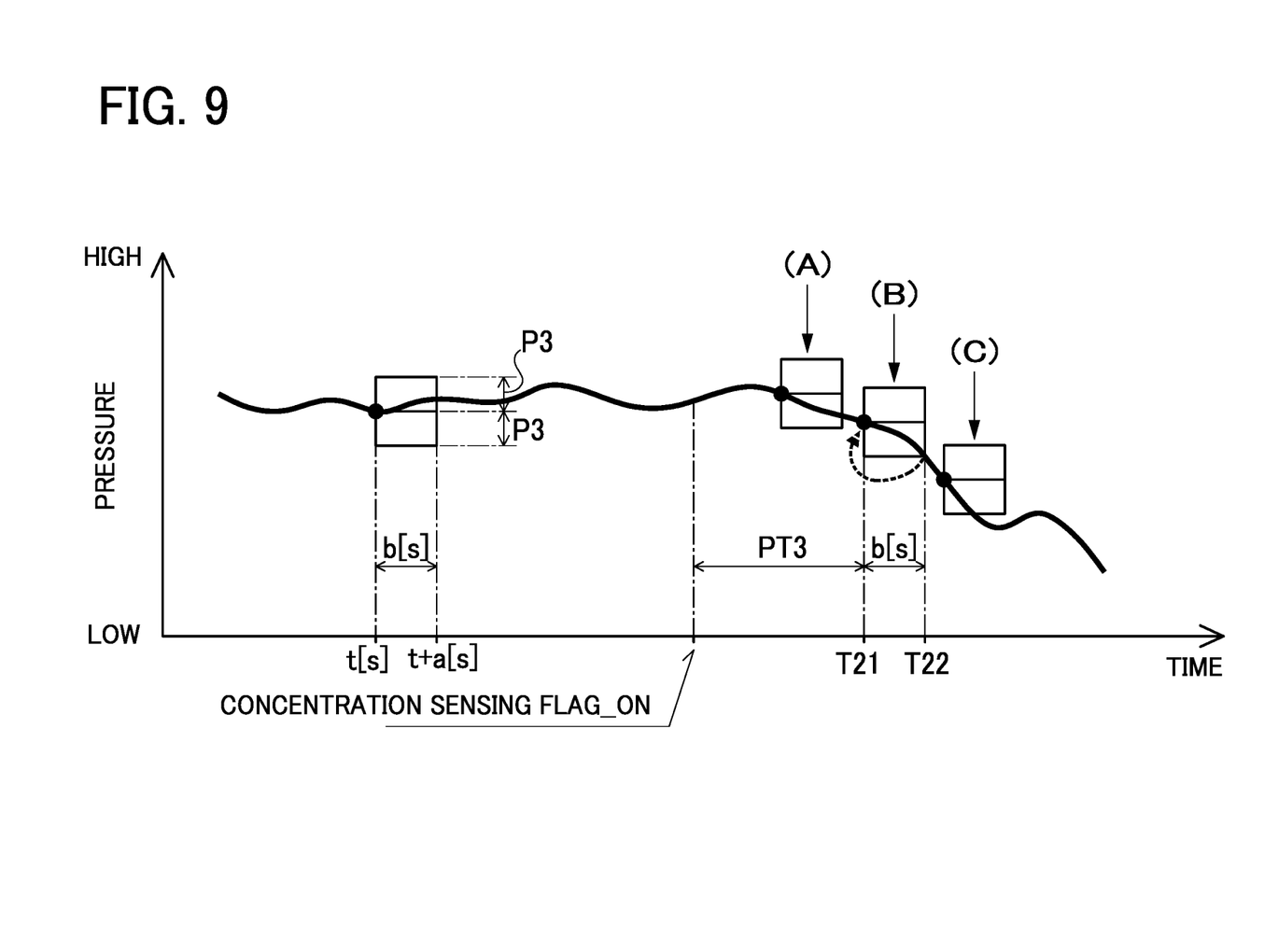
FIG. 9 is a graph showing one example of continuous data of time variations in pressure, i.e., a pump downstream pressure or a pump differential pressure.

Detecting of a purge concentration in Example 3 will be described below. This example differs from Example 2 in that the controller 10 is configured to read and store the time and the pressure (step S26) and then calculate a concentration based on the pressure P(t) (step S28) when the change rate of pressure (i.e., pump downstream pressure or pump differential pressure) from time t [s] to time t+b [s] with respect to the predetermined time b [s] is equal to or larger than a predetermined change rate RC (step S27: YES). Specifically, when the pressure temporal change rate when changing from the pressure P(t) at time t [s] to the pressure P(t+b) at time t+b [s] is equal to or larger than the predetermined change rate RC, the controller 10 detects a purge concentration based on the pressure P(t), not on the pressure P(t+b). When the pressure data is continuous data, for example, the controller 10 detects a purge concentration based on the pressure at time T21, which is one example of the time t [s] specified retroactively from the time T22 which is one example of the time t+b [s], as shown in FIG. 9. In FIG. 8, steps S21 to S26 are the same as steps S1*l* to S16 in FIG. 6.

In FIG. 9, the following expression is established:

(Pressure change rate *P*3)/(Predetermined time *b*[*s*])
=Predetermined change rate *RC*

Further, in FIG. 9, (A) shows one example that the pressure temporal change rate is less than the predetermined change rate RC; (B) indicates one example that the pressure temporal change rate is equal to the predetermined change rate RC, that is, the pressure temporal change rate reaches the predetermined change rate RC; and (C) shows one example that the pressure temporal change rate is larger than the predetermined change rate RC.

In the above manner, in Example 3, the predetermined timing elapsed by a predetermined time PT3 from setting of the concentration sensing flag to ON is assumed as the time point (time T21) going back from the time point (time T22) at which the temporal change rate of the pump downstream pressure or pump differential pressure becomes the predetermined change rate RC or more after the concentration sensing flag is set to ON as shown in FIG. 9. The controller 10 thus detects a purge concentration based on the pressure (i.e., the pump downstream pressure or pump differential pressure) at time T21.

According to Example 3, as described above, the controller 10 switches the purge valve 14 to the closed state once, subsequently switches the purge valve 14 to the open state and also sets the concentration sensing flag to ON, and then detects a purge concentration based on the pump downstream pressure or the pump differential pressure at the predetermined timing elapsed by the predetermined time PT3 from the time of setting the concentration sensing flag to ON.

Thus, the evaporated fuel treatment apparatus 1 in Example 3 can detect a purge concentration more stably as in Examples 1 and 2.

In Example 3, the predetermined timing is assumed as the time point specified retroactively from the time point when the temporal change rate of the pump downstream pressure or the pump differential pressure becomes a predetermined change rate RC or more after the concentration sensing flag is set to ON.

Accordingly, the evaporated fuel treatment apparatus 1 in Example 3 can detect a purge concentration more stably as in Example 2.

The controller 10 may be configured to detect a purge concentration by changing the predetermined time PT3 to the prescribed time Ta when the pump downstream pressure or the pump differential pressure at the predetermined timing deviates from the corresponding pump downstream pressure or pump differential pressure detected just before the concentration sensing flag is set to ON by the predetermined pressure value P1 or more.

Modified Example

Examples 1 to 3 exemplify purge concentration detection performed when the purge valve 14 is switched from the closed state to the open state. However, the present disclosure is not limited thereto and may be applied to another example in which purge concentration detection is conducted when the purge valve 14 is switched from the open state to the closed state. FIGS. 5, 6, and 8 are available as flowcharts of this modified example excepting that the conditions "open" and "closed" are respectively replaced with "closed" and "open". Furthermore, a concentration sensing flag in the modified example corresponds to one example of a "valve-closing execution flag" to switch a purge valve to a closed state in the present disclosure. Accordingly, after switching the purge valve 14 to the closed state, the controller 10 can prevent from erroneously performing detection of a purge concentration based on the pump downstream pressure or pump differential pressure that has started to increase. Detection of a purge concentration can therefore further stably be performed.

The foregoing embodiments are mere examples and give no limitation to the present disclosure. The present disclosure may be embodied in other specific forms without departing from the essential characteristics thereof.

REFERENCE SIGNS LIST

1 Evaporated fuel treatment apparatus
10 Controller
11 Canister
12 Purge passage
13 Purge pump
14 Purge valve
17 Gauge pressure sensor
18 Differential pressure sensor
100 Internal combustion engine system
EN Engine
IP Intake passage
FT Fuel tank
PT1, PT2, PT3 Predetermined time
P1, P2 Predetermined pressure value
Ta Prescribed time
RC Predetermined change rate

What is claimed is:

1. An evaporated fuel treatment apparatus comprising:
a canister configured to store evaporated fuel;
a purge passage configured to allow purge gas containing the evaporated fuel to flow from the canister to an engine through an intake passage;
a purge pump provided in the purge passage and configured to deliver the purge gas to the intake passage;
a purge valve configured to open and close the purge passage; and
a controller configured to drive the purge valve under duty control while driving the purge pump to execute purge control to introduce the purge gas from the canister to the engine through the purge passage and the intake passage,
wherein the controller is configured to switch the purge valve to a closed state or an open state once, subsequently set either a valve-opening execution flag to switch the purge valve to the open state or a valve-closing execution flag to switch the purge valve to the closed state, and then detect a purge concentration corresponding to a concentration of the evaporated fuel in the purge gas based on a pressure in the purge passage downstream of the purge pump or a front-rear differential pressure of the purge pump in the purge passage at a predetermined timing elapsed by a predetermined time from when the valve-opening execution flag or the valve-closing execution flag is set to ON.

2. The evaporated fuel treatment apparatus according to claim 1, wherein the predetermined time is a time obtained by calculation based on information related to a state of the purge passage.

3. The evaporated fuel treatment apparatus according to claim 2, wherein the information related to the state of the purge passage includes information obtained by calculation based on a previous detection value of the purge concentration.

4. The evaporated fuel treatment apparatus according to claim 3, wherein when the downstream pressure of the purge pump or the differential pressure of the purge pump at the predetermined timing deviates by a predetermined pressure value or more as compared with the downstream pressure of the purge pump or the differential pressure of the purge pump obtained just before the valve-opening execution flag or the valve-closing execution flag is turned ON, the controller is configured to change the predetermined time to a prescribed time and detect the purge concentration.

5. The evaporated fuel treatment apparatus according to claim 2, wherein when the downstream pressure of the purge pump or the differential pressure of the purge pump at the predetermined timing deviates by a predetermined pressure value or more as compared with the downstream pressure of the purge pump or the differential pressure of the purge pump obtained just before the valve-opening execution flag or the valve-closing execution flag is turned ON, the controller is configured to change the predetermined time to a prescribed time and detect the purge concentration.

6. The evaporated fuel treatment apparatus according to claim 1, wherein the predetermined timing is a time point specified retroactively from when a temporal change rate of either the downstream pressure of the purge pump or the differential pressure of the purge pump reaches a predetermined change rate or more after the valve-opening execution flag or the valve-closing execution flag is set to ON.

7. The evaporated fuel treatment apparatus according to claim 6, wherein when the downstream pressure of the purge pump or the differential pressure of the purge pump at the predetermined timing deviates by a predetermined pressure value or more as compared with the downstream pressure of the purge pump or the differential pressure of the purge pump obtained just before the valve-opening execution flag or the valve-closing execution flag is turned ON, the controller is configured to change the predetermined time to a prescribed time and detect the purge concentration.

8. The evaporated fuel treatment apparatus according to claim 1, wherein when the downstream pressure of the purge pump or the differential pressure of the purge pump at the predetermined timing deviates by a predetermined pressure value or more as compared with the downstream pressure of the purge pump or the differential pressure of the purge pump obtained just before the valve-opening execution flag or the valve-closing execution flag is turned ON, the controller is configured to change the predetermined time to a prescribed time and detect the purge concentration.

\* \* \* \* \*